US006236858B1

United States Patent
Griffith (10) Patent No.: US 6,236,858 B1
(45) Date of Patent: May 22, 2001

(54) WIRELESS TERMINAL AUTOMATICALLY ALERTING USER UPON WIRELESS TERMINAL ENTERING A SPECIFIED PHYSICAL LOCATION

(75) Inventor: Gary L. Griffith, Arvada, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/109,218

(22) Filed: Jun. 30, 1998

(51) Int. Cl.[7] .................................................. H04Q 7/20
(52) U.S. Cl. ........................ 455/435; 455/456; 455/567
(58) Field of Search ................................ 455/434, 525, 455/456, 435, 426; 342/450

(56) References Cited

U.S. PATENT DOCUMENTS

| | | |
|---|---|---|
| 4,275,385 | 6/1981 | White ................................. 340/312 |
| 4,347,501 | 8/1982 | Akerberg . |
| 5,151,684 * | 9/1992 | Johnsen ............................ 340/568.1 |
| 5,153,584 | 10/1992 | Engira . |
| 5,311,570 | 5/1994 | Grimes et al. ........................ 379/57 |
| 5,479,408 | 12/1995 | Will ..................................... 370/94.1 |
| 5,485,163 | 1/1996 | Singer et al. ........................ 342/457 |
| 5,502,758 * | 3/1996 | Tsuzuki et al. ........................ 379/58 |
| 5,589,820 * | 12/1996 | Robinson et al. ................. 340/572.3 |
| 5,664,113 * | 9/1997 | Worger et al. .......................... 705/28 |
| 5,682,142 * | 10/1997 | Loosmore et al. ................. 340/572.1 |
| 5,767,772 * | 6/1998 | Lemaire et al. ..................... 340/571 |
| 5,815,811 * | 9/1998 | Pinard et al. ......................... 455/434 |
| 5,838,234 * | 11/1998 | Roulleaux-Robin .............. 340/572.3 |
| 5,867,103 * | 2/1999 | Taylor, Jr. ............................. 340/573 |
| 5,892,454 * | 4/1999 | Schipper et al. ................. 340/825.37 |
| 6,002,918 * | 12/1999 | Heiman et al. ...................... 455/38.3 |

FOREIGN PATENT DOCUMENTS

| | | | |
|---|---|---|---|
| 0 416 792 A2 | 3/1991 | (EP) | ................................ G08B/3/10 |
| 0 578 374 A1 | 1/1994 | (EP) | ............................. H04M/11/00 |
| 0737020A | 10/1996 | (EP) | ................................ H04Q/7/38 |
| 0 840 265 A1 | 5/1998 | (EP) | .............................. G08B/13/14 |
| 2223869A | 4/1990 | (GB) | .............................. G08B/25/00 |
| 2294375A | 4/1996 | (GB) | ................................. G01S/1/08 |

\* cited by examiner

*Primary Examiner*—Edward F. Urban
*Assistant Examiner*—Blane J. Jackson
(74) *Attorney, Agent, or Firm*—John C. Moran (57) ABSTRACT

Detecting a wireless terminal being taken from a facility. In a first embodiment, a base station is assigned to each exit from the facility. The base station uses a directional antenna which only communicates with wireless terminals within the exit area. When a wireless terminal enters the exit area and registers on the base station, the base station transmits the registration information to a wireless switching system that immediately places a telephone call to the user of the wireless terminal to inform them that they have not turned in their wireless terminal. Alernatively, in a third embodiment, after the wireless terminal is registered, the base station rather than the wireless switching system places a telephone call to the user of the wireless terminal to inform them that they have not turned in their wireless terminal. In a second embodiment of the invention, a transmission signal separate from the frequencies utilized for voice and data communication by the wireless switching system is utilized to alert the wireless terminal to the fact that the wireless terminal is in an exit area. The wireless terminal is responsive to this alerting to place a call to the wireless switching system to inform the wireless switching system of this fact. The wireless switching system then alerts the user via the wireless terminal.

12 Claims, 9 Drawing Sheets

WIRELESS TERMINAL AUTOMATICALLY ALERTING USER UPON WIRELESS TERMINAL ENTERING A SPECIFIED PHYSICAL LOCATION

TECHNICAL FIELD

This invention relates wireless telecommunication, and in particular, to wireless terminals.

BACKGROUND OF THE INVENTION

The utilization of personal communication service (PCS) wireless terminals and switching systems is increasing for office buildings, large retail stores, hospitals, etc. The capability of being able to communicate with employees where ever they may be in a facility has proven to be worth the cost of the installation of PCS systems. Within office buildings where the employees work the same set of hours, it is necessary to assign to each employee their own PCS wireless terminal. However, within large retail stores and hospitals where multiple shifts are worked during the day, it is sufficient to have a number of PCS wireless terminals equal to the number of employees on a given shift. The sharing of PCS terminals in this manner greatly reduces the cost of installing a PCS system.

Problems have arisen because of the small size of the PCS terminals, and the fact that employees become accustomed to having the PCS terminal on their person. The end result is that an employee leaving for the day has a reasonable probability of leaving the facility with the PCS terminal; thus, leaving another employee on the next shift without a PCS terminal. In general, the problem is not so much that the employees are trying to steal the PCS terminals, but rather that they are simply forgetting to turn the PCS terminal in at the end of their shift.

What is needed is a procedure and mechanism whereby the employees will be alerted if they attempt to leave the facility with a PCS terminal.

SUMMARY OF THE INVENTION

The preceding problem is solved and a technical advance is achieved by an apparatus and method that allows the detection of a wireless terminal leaving a facility by a wireless switching system. Advantageously, in a first embodiment, a base station is assigned to each exit from the facility. The base station uses a directional antenna which only communicates with wireless terminals within the exit area. When a wireless terminal enters the exit area and registers on the base station, the base station transmits the registration information to a wireless switching system that immediately places a telephone call to the user of the wireless terminal to inform them that they have not turned in their wireless terminal.

Advantageously, in a second embodiment of the invention, a transmission signal separate from the frequencies utilized for voice and data communication by the wireless switching system is utilized to alert the wireless terminal to the fact that the wireless terminal is in an exit area. The wireless terminal is responsive to this alerting to place a call to the wireless switching system to inform the wireless switching system of this fact. The wireless switching system then alerts the user via the wireless terminal. In addition, if the wireless terminal is in a standby mode when it enters the exit area, it is responsive to the separate transmission signal to power up the wireless terminal so that the wireless terminal can alert the wireless switching system. The separate transmission signal may be a low radio frequency, a high radio frequency, an optical transmission, etc.

Advantageously, in a third embodiment of the invention, a base station is assigned to each exit from the facility. The base station uses a directional antenna which only communicates with wireless terminals within the exit area. When a wireless terminal enters the exit area and registers on the base station, the base station performs the normal registration operations with a wireless switching system. After the wireless terminal is registered, the base station places a telephone call to the user of the wireless terminal to inform them that they have not turned in their wireless terminal.

These and other features and advantages of the invention will become more apparent from the following description of an illustrative embodiment of the invention considered together with the drawing.

DETAILED DESCRIPTION

Figure 1:
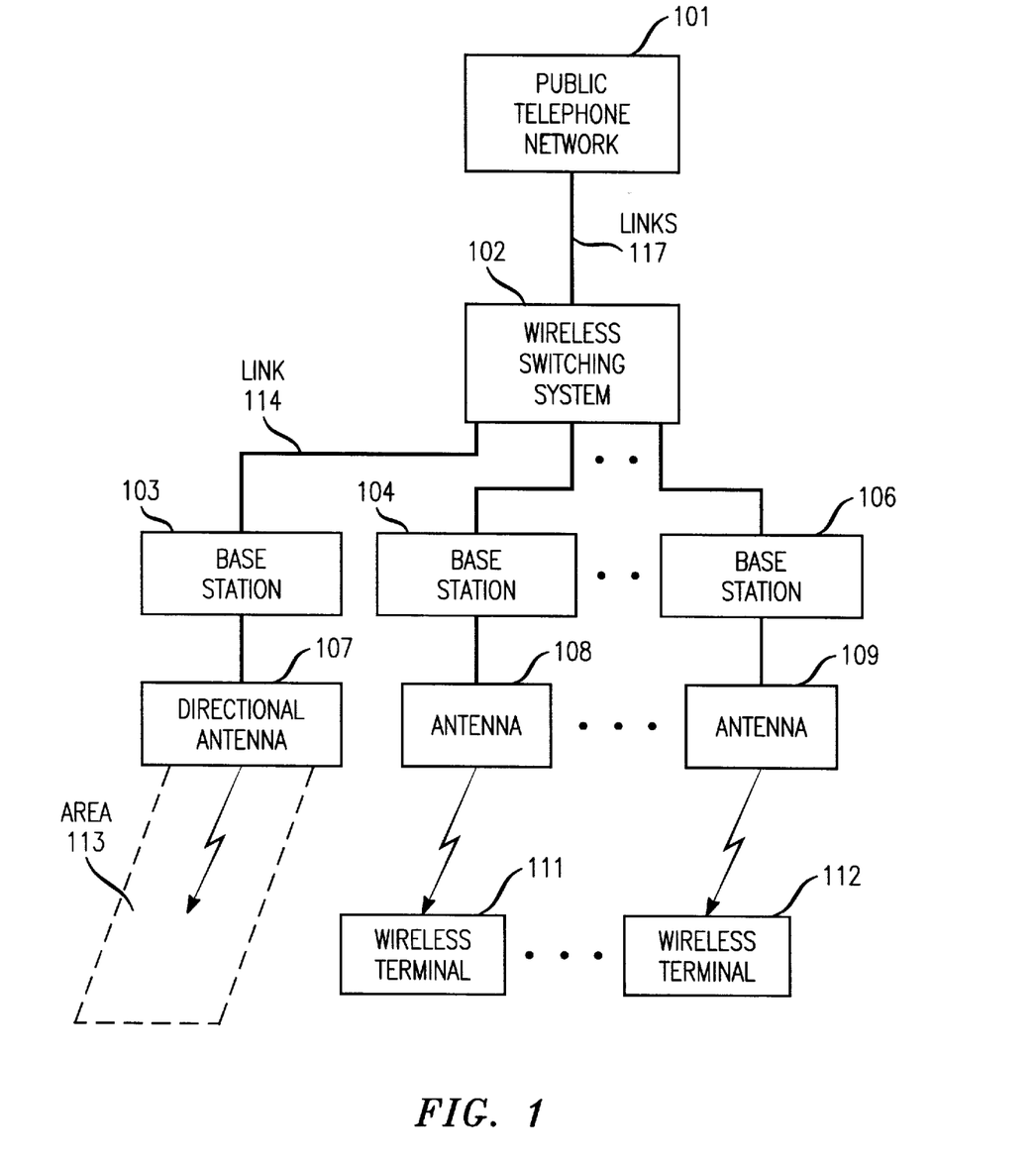
FIG. 1 illustrates a system for implementing a first embodiment of the invention.

FIG. 1 illustrates a block diagram of a telephone system that implements the first embodiment of the invention. FIG. 1 illustrates wireless switching system 102 communicating with public telephone network 101 via links 1 17 to provide public access for wireless terminals 111–112 via base stations 104–106 and antennas 108–109. Wireless terminals 111–112 operate with wireless switching system 102 via base stations 104–106 using well known techniques in the art. Base stations 103–106 are standard base stations. Base station 103 is different in that it utilizes a directional antenna 107 that limits its wireless coverage area to an area of an exit from a facility. In FIG. 1, this area is denoted as area 113. Antennas 103–109 do not have their wireless coverage areas inhibited. As is well known in the art, when a wireless terminal moves from an area covered by one base station to an area covered by another base station, the wireless terminal registers on the base station whose transmission signal is the strongest. For example, when wireless terminal 111 moves from the coverage area of base station 104 into area 113, wireless terminal 111 will be receiving a stronger transmission signal from base station 103 via directional antenna 107 then from base station 104 via antenna 108. Wireless terminal 111 registers on base station 103. Base station 103 is responsive to the registration of wireless terminal 111 to implement standard registration procedures with wireless switching system 102. Wireless switching system 102 performs the operations necessary to register wireless terminal 111 on base station 103. In addition, wireless switching system 102 establishes a wireless link or a telephone call to wireless terminal 111. Wireless switching system 102 then notifies the user of wireless terminal 111 that the user is about to exit the facility with wireless terminal 111. This notification to the user can simply be an auto tone via the wireless link that wireless switching system 102 has wireless terminal 111 produce or it may be a recorded message that is delivered to the user when the user answers the telephone call. A voice path does not have to be set up to wireless terminal 111 to produce an audio warning tone if the wireless link is used. Greater details on this operation is set forth with respect to FIG. 2.

Figure 2:
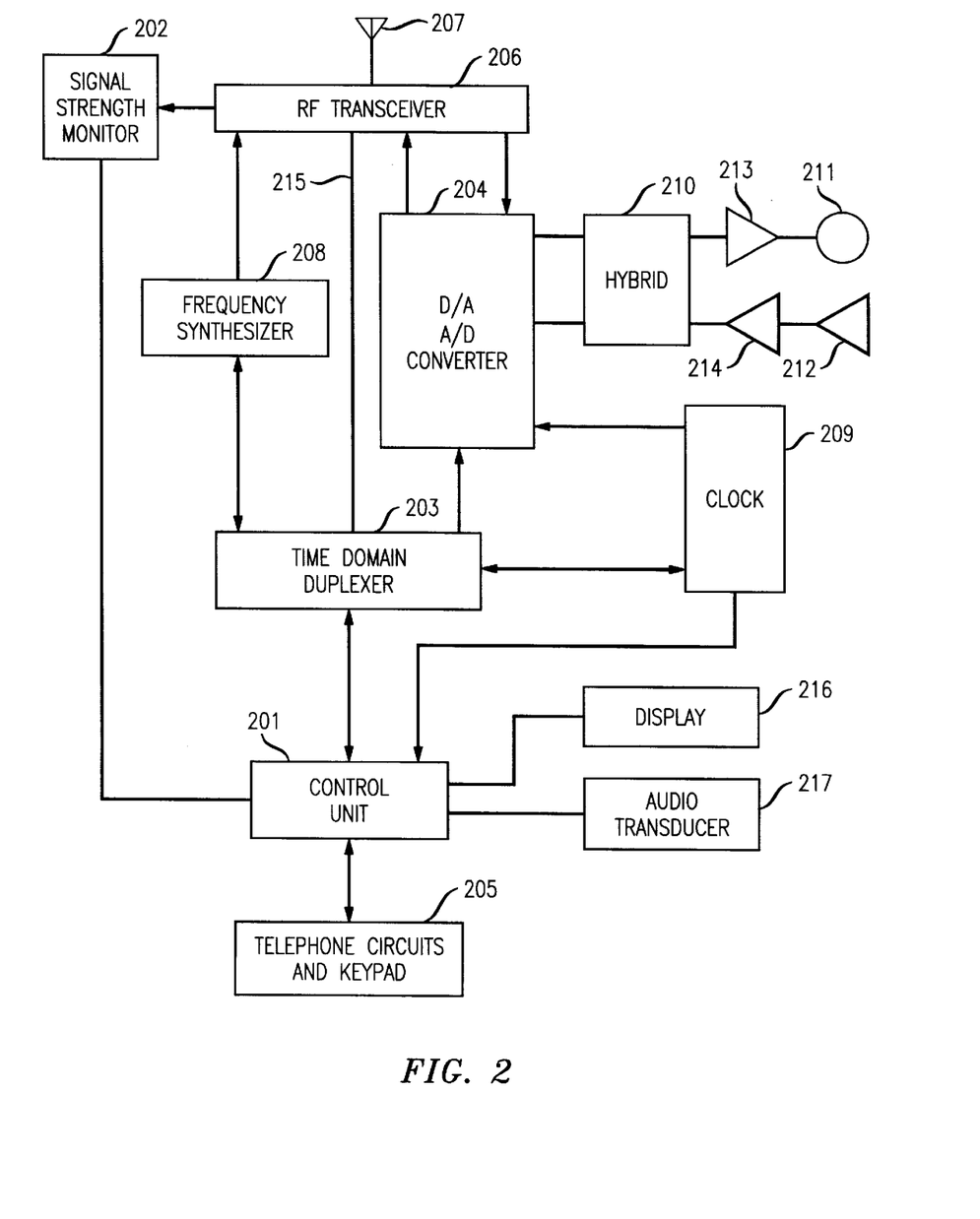
FIG. 2 illustrates a block diagram of a wireless terminal for use with the first embodiment of the invention.

Wireless terminal 111 is advantageously illustrated in greater detail in FIG. 2. The other wireless terminals are similar in design. Wireless set 111 implements a wireless protocol that allows wireless terminal 111 to establish a wireless signal link with wireless switching system 102 via base stations 103–106. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless terminal is provided by control unit 201. Units 202, 203, 206, 207, 208, and 209 provide the RF communication capabilities for the wireless terminal. Elements 204, 210, and 211–214 provide the audio information received and transmitted to the user; whereas, elements 216–218 and 205 provide the basic user interface.

Considering the following example of the operation of wireless terminal 111. When control unit 201 via single strength monitor 202 determines that the transmission signal being received from base station 103 is stronger than the transmission signal being received from base station 104, control unit 201 performs the registration procedures with base station 103. Upon detecting the registration of wireless terminal 111 on base station 103, wireless switching system 102 can transmit via the wireless signal link a message which will activate audio tranducer 217 and also may send a message to indicate on display 216 that wireless handset 111 is being carried out of the facility. Also, wireless switching system 102 may set up a voice telephone call to wireless terminal 111. When the user answers this call, wireless switching system 102 plays a recorded message to the user utilizing elements 204, 206, 210, 211, and 213. The voice message informs the user that wireless terminal 111 is about to be taken out of the facility.

Figure 3:
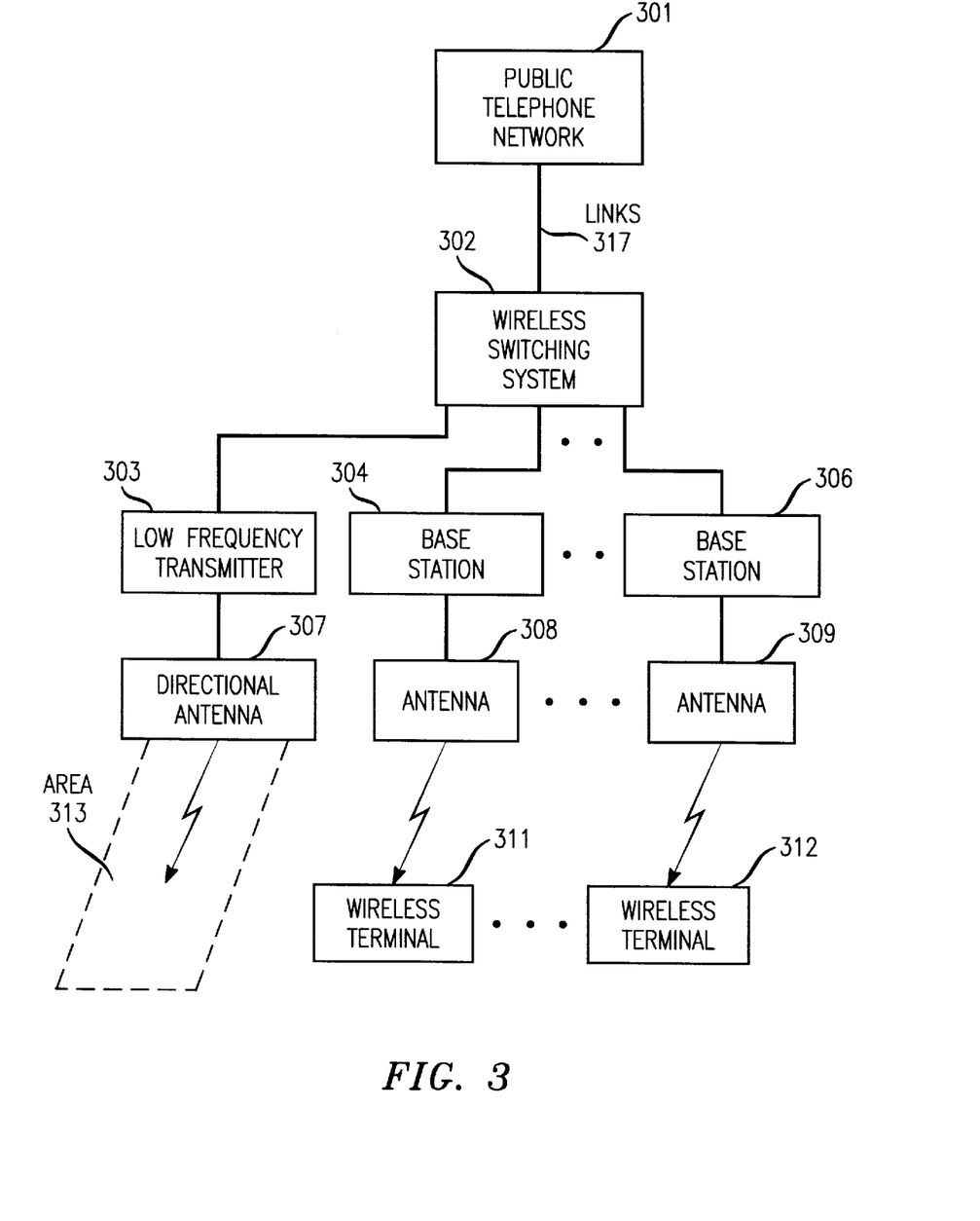
FIG. 3 illustrates a system for implementing a second embodiment of the invention.

FIG. 3 illustrates another system having a second embodiment for implementing the invention. FIG. 3 illustrates wireless switching system 302 communicating with public telephone network 301 via links 317 to provide public access for wireless terminals 311–312 via base stations 304–306 and antennas 308–309. Wireless terminals 311–312 operate with wireless switching system 302 via base stations 304–306 using well known techniques in the art. It is assumed that base station 304 via antenna 308 provides coverage for area 313. When a wireless terminal, such as wireless terminal 311, moves into area 313, wireless terminal 311 receives a low frequency transmission from low frequency transmitter 303 via directional antenna 307. Wireless terminal 311 is responsive to this low frequency transmission to establish a wireless signaling link with wireless switching system 302 via base station 304. Note, the wireless signal link may be already established. Over this wireless signaling link, wireless terminal 311 informs wireless switching system 302 that it is receiving the low frequency transmission. Wireless switching system 302 then alerts the user of the wireless terminal 311 using operations previously described with respect to FIGS. 1 and 2. One skilled in the art could readily envision that low frequency transmitter 303 could transmit at any RF frequency or could be an optical transmitter with the wireless terminals having the capability of receiving this type of transmission. Advantageously, if wireless terminal 311 is in the standby mode, upon receiving the transmission from low frequency transmitter 303, wireless terminal 311 is activated so as to establish the wireless signaling link.

Figure 4:
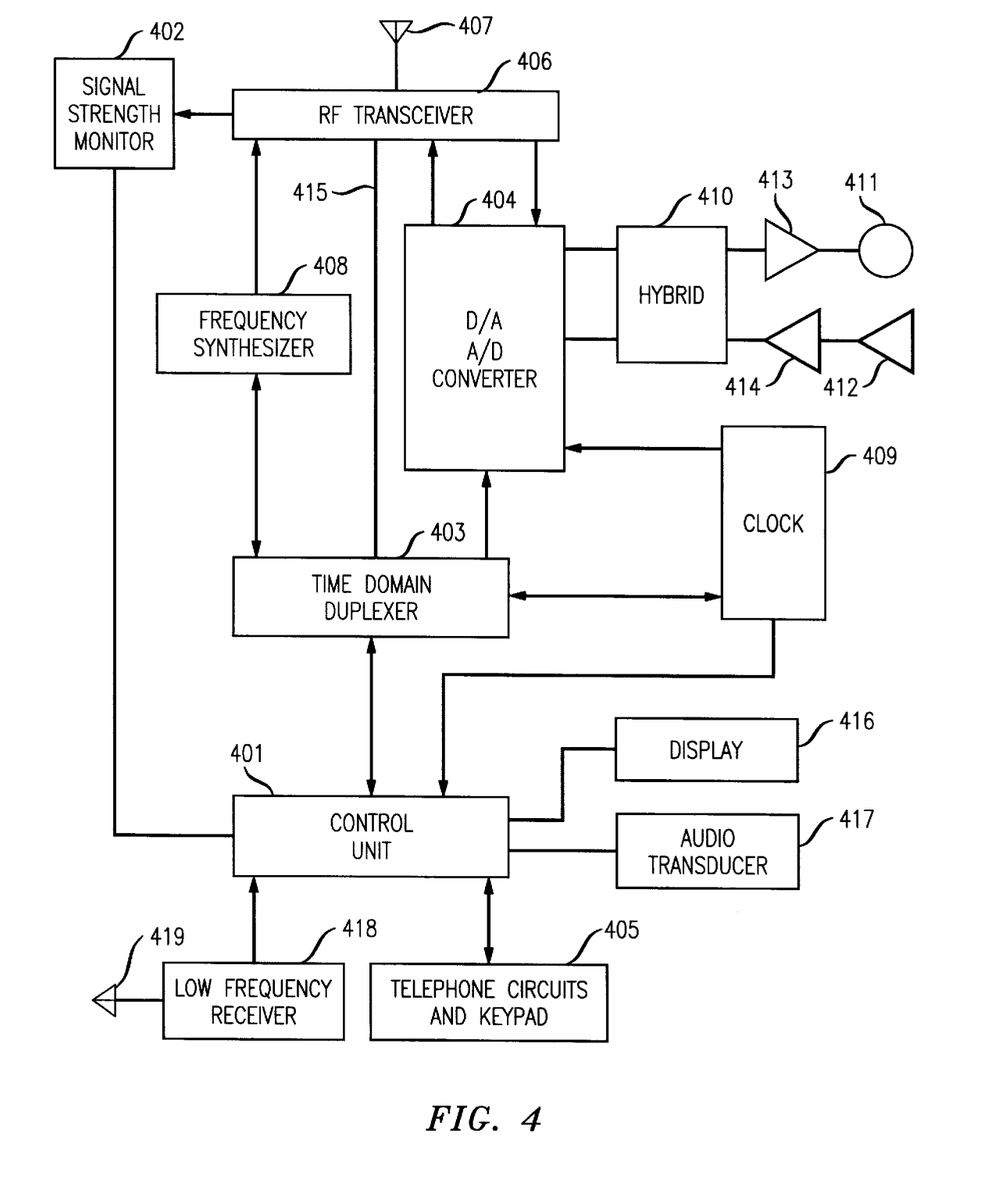
FIG. 4 illustrates a block diagram of a wireless terminal for use with the second embodiment of the invention.

Wireless terminal 311 is advantageously illustrated in greater detail in FIG. 4. The other wireless terminals are similar in design. Wireless set 311 implements a wireless protocol that allows wireless terminal 311 to establish a wireless signal link with wireless switching system 302 via base stations included in wireless switching system 302. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless terminal is provided by control unit 401. Units 402, 403, 406, 407, 408, and 409 provide the RF communication capabilities for the wireless terminal. Elements 404, 410, and 411–414 provide the audio information received and transmitted to the user; whereas, elements 416–418 and 405 provide the basic user interface. The low frequency transmission from low frequency transmitter 303 is received by low frequency receiver 418 via antenna 419. Upon reception of the low frequency transmission, low frequency receiver 418 transmits a control signal to control unit 401. Control unit 401 is responsive to this signal to power up if in the standby mode and to establish a wireless signaling link with wireless switching system 302. Once the wireless signaling link has been established, control unit 401 transmits a message to wireless switching system 302 to inform it that wireless terminal 311 is receiving the low frequency transmission. Wireless switching system 302 then alerts the user of wireless terminal 311 using similar operations as performed by wireless switching system 302 with wireless terminal 311.

Figure 5:
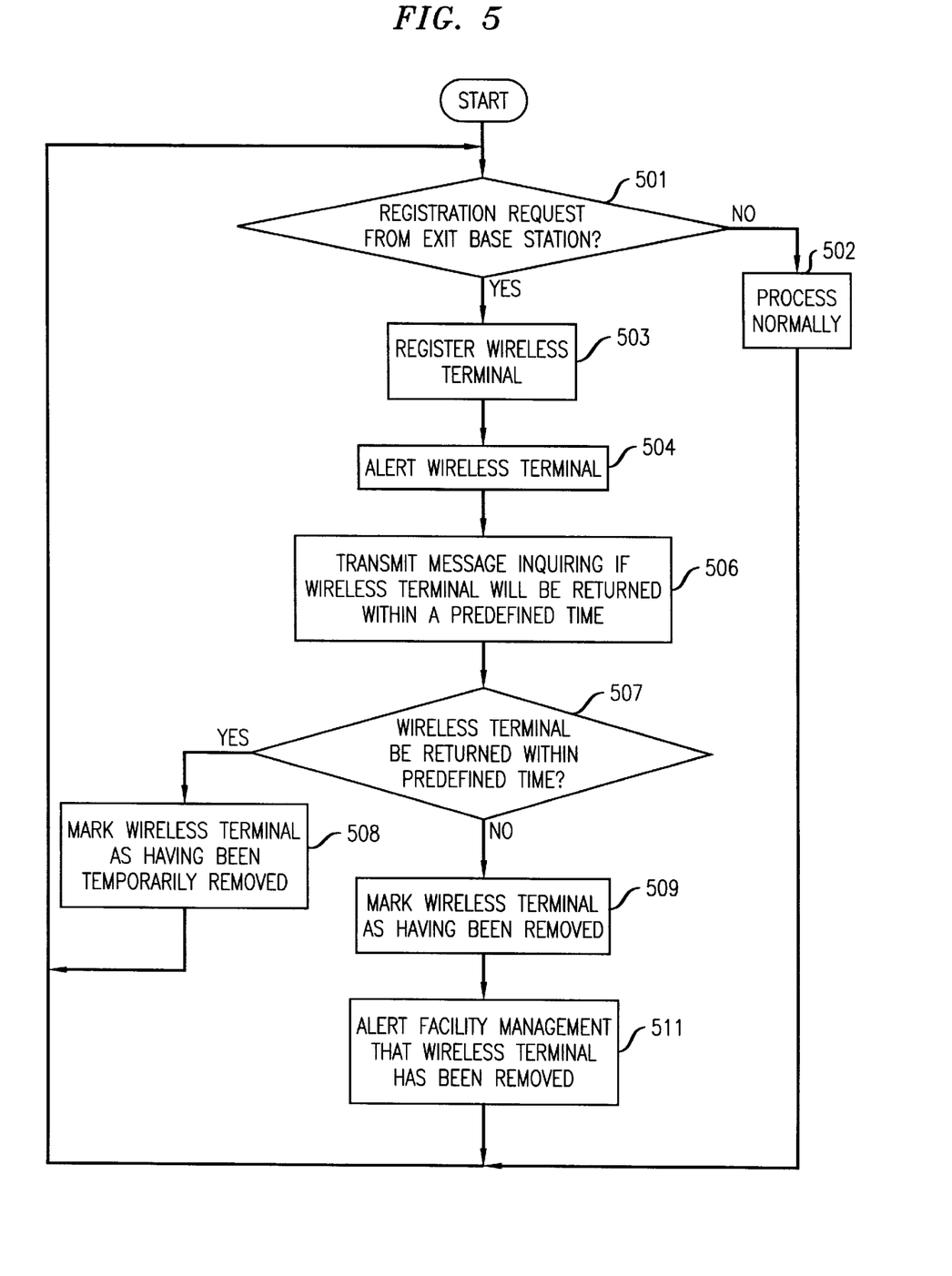
FIG. 5 illustrates, in flow chart form, steps performed by a wireless switching system in implementing the first embodiment of the invention.

FIG. 5 illustrates, in flow chart form, the steps performed by wireless switching system 102 in the first embodiment of the invention. Decision block 501 is responsive to an operation to determine if this operation is a registration request from a base station located at an exit to the facility. If the answer is no, the operation is processed in a normal fashion by block 502 before control is transferred back to decision block 501.

If the operation is a registration at a base station located at an exit, block 503 registers the wireless terminal and then transfers control to block 504. The latter block alerts the wireless terminal either by transmission of a message that causes an audio alerting signal in the wireless terminal, transmission of an alphanumeric display message, or a voice message transmitted via a telephone call. One skilled in the art could readily see that all or a combination of these alerting operations could be utilized in block 504. Block 506 then transmits a message inquiring if the wireless terminal will be returned to the facility within a predefined amount of time. This message can be transmitted either via an alphanumeric display on the wireless terminal or as a recorded voice message. The user of the wireless terminal then responds utilizing the keyboard. This is done so as to allow users to temporarily leave the facility for lunch breaks, etc. After execution of block 506, decision block 507 determines if a message was received from the wireless terminal indicating that the wireless terminal will be returned within the predefined amount of time. If the answer is yes, block 508 marks the wireless terminal as having been temporarily removed before transferring control back to decision block 508. If the answer in decision block 507 is a message stating no from the user or no message is received from the user at all, control is transferred to block 509 which marks the wireless terminal as having been removed from facility. Block 511 then alerts the facility management to the fact that the wireless terminal has been removed. The facility management is alerted so that the management can take steps to assure that there are adequate wireless terminals available for the next shift. After execution, block 511 transfers control back to decision block 501.

Figure 6:
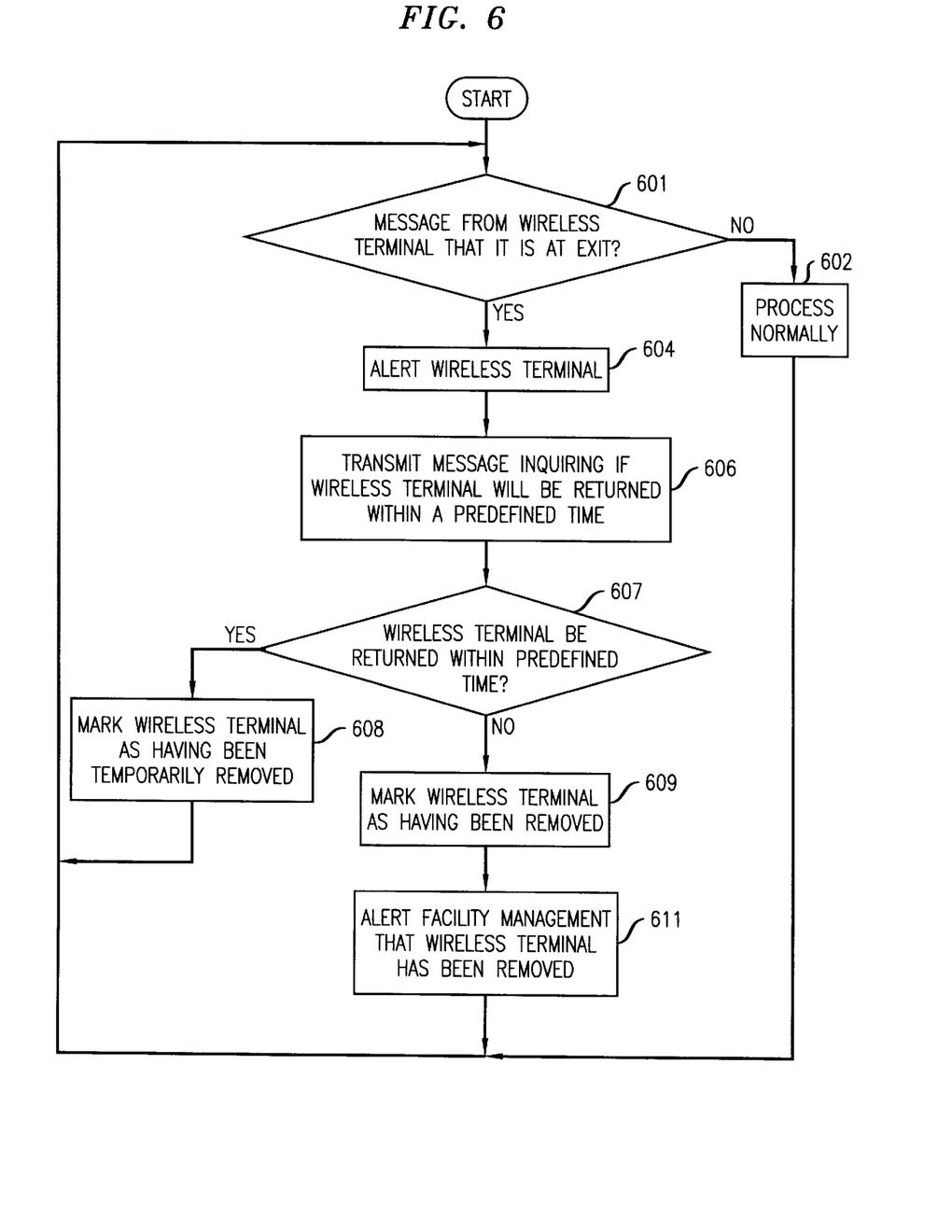
FIG. 6 illustrates, in flow chart form, steps performed by a wireless switching system in implementing the second embodiment of the invention.

FIG. 6 illustrates, in flow chart form, the steps performed by wireless switching system 302 in implementing the invention in accordance with the second embodiment. Decision block 601 determines if a message is being received from a wireless terminal indicating that it is in area 313. If the answer in no, control is transferred to block 602 for normal processing. After execution of block 602, control is transferred back to decision block 601. If the answer is yes in decision block 601, control is transferred to block 604. Block 604 alerts the wireless terminal either by transmission of a message that causes an audio alerting signal in the wireless terminal, transmission of an alphanumeric display message, or a voice message transmitted via a telephone call. One skilled in the art could readily see that all or a combination of these alerting operations could be utilized in block 604. Block 606 then transmits a message inquiring if the wireless terminal will be returned to the facility within a predefined amount of time. This message can be transmitted either via an alphanumeric display on the wireless terminal or as a recorded voice message. The user of the wireless terminal then responds utilizing the keyboard. This is done so as to allow users to temporarily leave the facility for lunch breaks, etc. After execution of block 606, decision block 607 determines if a message was received from the wireless terminal indicating that the wireless terminal will be returned within the predefined amount of time. If the answer is yes, block 608 marks the wireless terminal as having been temporarily removed before transferring control back to decision block 608. If the answer in decision block 607 is a message stating no from the user or no message is received from the user at all, control is transferred to block 609 which marks the wireless terminal as having been removed from facility. Block 611 then alerts the facility management to the fact that the wireless terminal has been removed. The facility management is alerted so that the management can take steps to assure that there are adequate wireless terminals available for the next shift. After execution, block 611 transfers control back to decision block 601.

Figure 7:
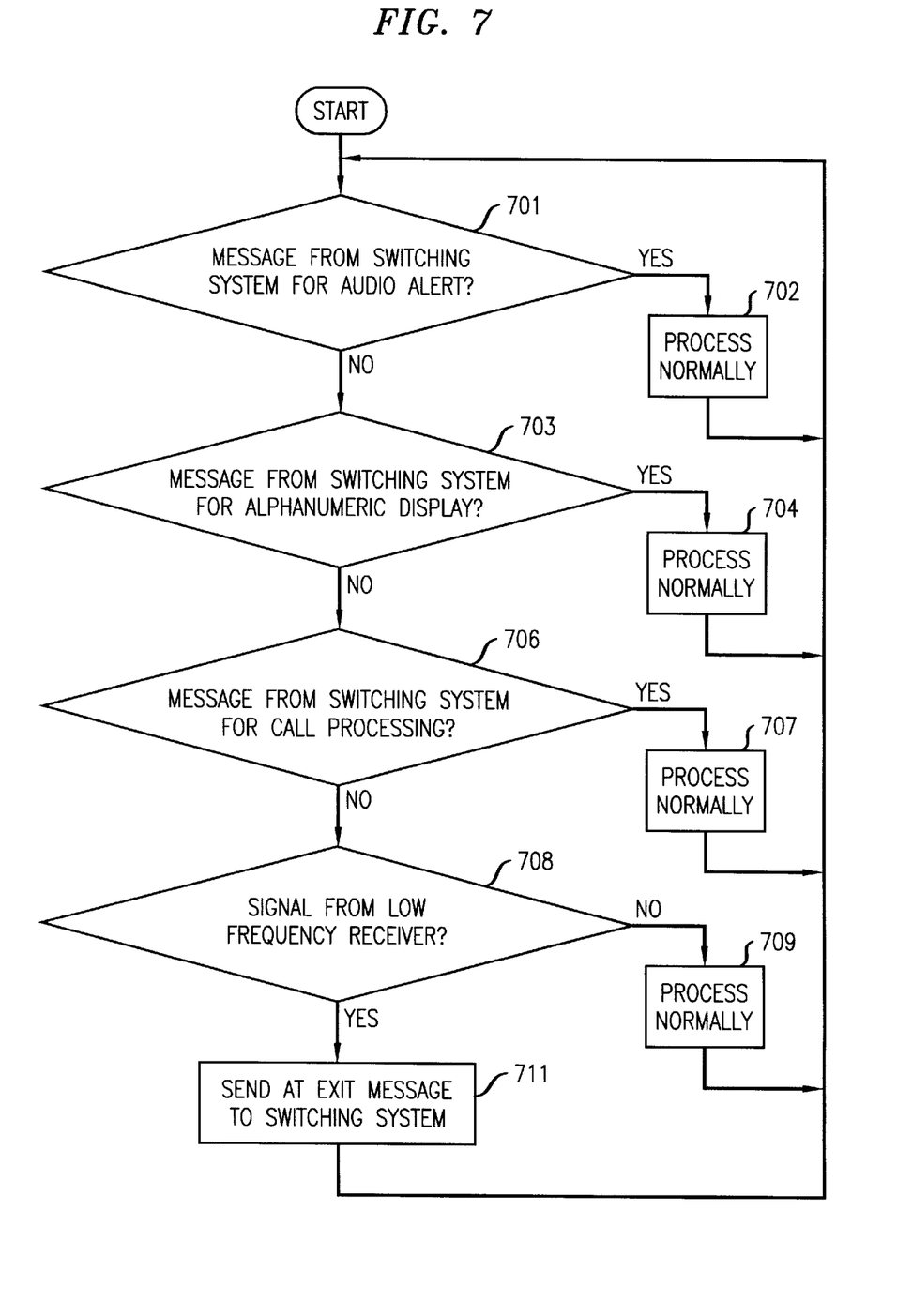
FIG. 7 illustrates, in flow chart form, steps performed by a wireless terminal in implementing the second embodiment of the invention.

FIG. 7 illustrates, in flow chart form, the steps performed by control unit 401 of FIG. 4 in implementing the second embodiment of the invention. Decision block 701 determines if a message has been received from wireless switching system 302 via the signaling link to produce an alerting signal on audio transducer 417. If the answer is yes, block 702 produces the desired audio alert alerting signal. Note, that this can be any audio alerting message from wireless switching system 302. If the answer in decision block 701 is no, decision block 703 determines if a message has been received from wireless switching system 302 to be displayed on display 416. If the answer is yes, block 704 performs this display function before transferring control back to decision block 701. If the answer in decision block 703 is no, decision block 706 determines if a message has been received from wireless switching system 302 that pertains to call processing functions, e.g., call setup, disconnect, connect, alerting, etc. If the answer is yes in decision block 706, block 707 performs normal call processing. Note, if wireless switching system 302 chooses to alert the user by placing a telephone call to the wireless terminal and playing a recorded message, blocks 706 and 707 perform these operations within the wireless terminal. If the answer in decision block 706 is no, decision block 708 determines if a signal is being received from low frequency receiver 418. If the answer is no, block 709 performs normal processing before returning control to decision block 701. If the answer in decision block 708 is yes, block 711 sends a message to wireless switching system 302 defining that the wireless terminal is at an exit to the facility before transferring control back to decision block 701.

Figure 8:
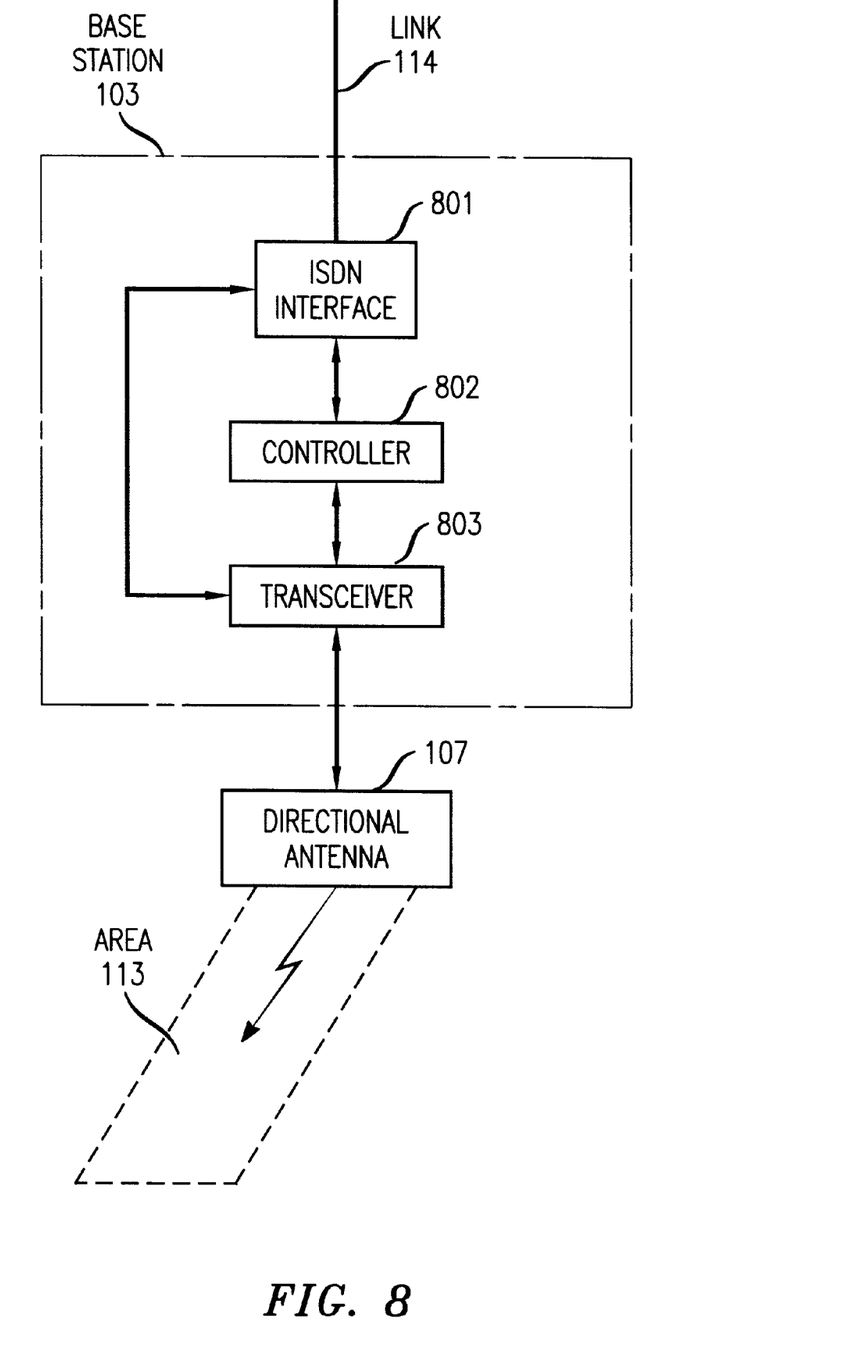
FIG. 8 illustrates, in block diagram form, a base station for implementing the third embodiment of the invention.

FIG. 8 illustrates an embodiment of base station 103 of FIG. 1 for implementing the third embodiment of the invention. Controller 802 communicates control information with wireless switching system 102 via link 114 and ISDN interface 801. ISDN interface 801 communicates audio information with transceiver 803. Controller 802 controls transceiver 803. Transceiver 803 transmits and receives transmission signals with wireless terminals via directional antenna 107.

Figure 9:
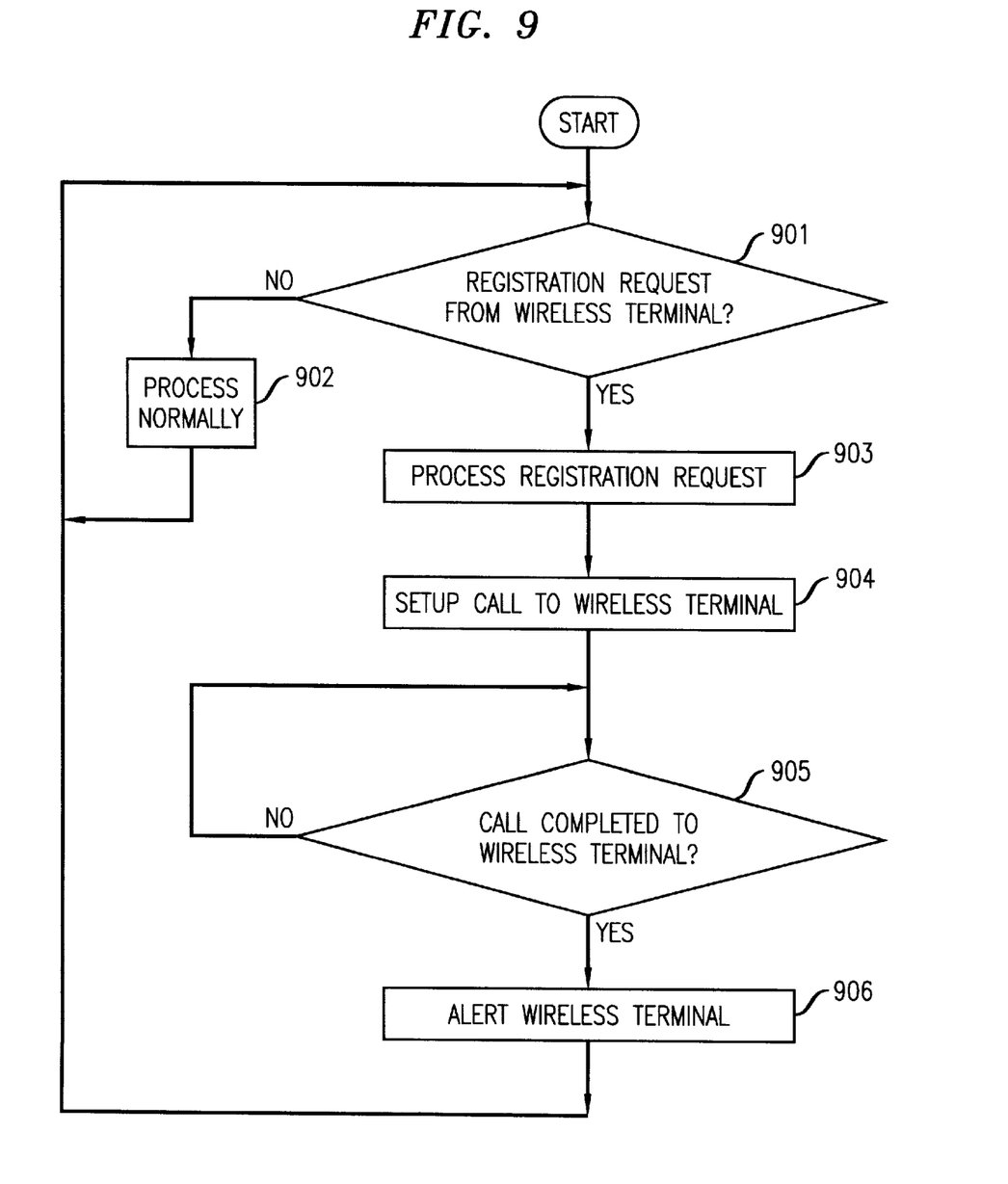
FIG. 9 illustrates, in flow chart form, steps performed by a controller of a base station in implementing the third embodiment of the invention.

FIG. 9 illustrates, in flow chart form, the steps performed by controller 802 in implementing the third embodiment of the invention. Decision block 901 determines if a registration request has been received from a wireless terminal. If a registration request has not been received, block 902 performs normal processing before returning control back to decision block 901. Block 902 would perform all normal call processing operations of a base station which are well known in the art. If the answer is yes in decision block 901, this means that a wireless terminal has entered area 113 of FIG. 8 and is attempting to register. If the answer is yes in block 901, control is transferred to block 903 which processes the registration request from the wireless terminal in the normal manner. Block 904 then sets up a call to the wireless terminal. Note, that the call being set up may be a voice call or simply a call that establishes a signaling link to the wireless terminal. After execution of block 904, control is transferred to decision block 905. The latter decision block determines when the call set up in block 904 has been completed to the wireless terminal. When the call has been completed, control is transferred to block 906 which alerts the wireless terminal to the fact that it is exiting the building. This alerting may be any of the methods described with respect to the first and second embodiments.

It is to be understood that the above-described embodiments are merely illustrative of the principles of the invention and that other arrangements may be devised by those skilled in the art without departing from the spirit or scope of the invention.

What is claimed is:

1. A method of alerting wireless telephones upon the wireless telephones entering exits from a facility where the wireless telephones are interconnected to a wireless telecommunication switching system via a plurality of base stations, comprising the steps of:

assigning an individual one of the plurality of base stations to provide wireless service for an individual one of the exits from the facility wherein the wireless service provided by each individual one of the plurality of base stations is limited to an area of each of the assigned one of the exits from the facility;

determining registration of the one of the wireless telephones by a one of the plurality of base stations individually assigned to the one of the exits from the facility;

originating a telephone call to the one of the wireless telephones by the one of the plurality of base stations via the wireless telecommunication switching system in response to the determination of registration of the one of the wireless telephones where the one of the plurality of base stations is the calling party of the telephone call;

connecting the telephone call from the one of the plurality of base stations communicated via the wireless telecommunication switching system to the one of the wireless telephones by the one of the plurality of base stations where the one of the plurality of base stations remains the calling party and the one of the wireless telephone is the called party;

generating an alerting message by the one of the plurality of base stations where the one of the plurality of base stations is the originating source of the alerting message and the alerting message states that a user is about to leave the facility with the one of wireless telephones; and transmitting the alerting message to the one of the wireless telephones via the established telephone call by the one of the plurality of base stations where the alerting message informs the user of the one of the wireless telephones that the user is about to leave the facility with the one of wireless telephones.

2. The method of claim 1 wherein the step of assigning comprises the step of restricting the area in which wireless service is provided by each individual one of the plurality of base stations by use of an directional antenna attached to each individual one of the plurality of base stations.

3. The method of claim 2 wherein the alerting message results in an audio signal at the one of the wireless telephones.

4. The method of claim 2 wherein the alerting message results in an alphanumeric display message on the one of the wireless telephones.

5. The method of claim 2 wherein the alerting message results in an voice message to the one of the wireless telephones.

6. An apparatus that performs the method of claim 2.

7. An apparatus that performs the method of claim 1.

8. An apparatus for alerting a wireless terminal upon the wireless telephone entering an exit area from a facility with the wireless telephone being provided wireless telephone service by a wireless telecommunication switching system having a plurality of attached base stations, comprising:

a base station for providing wireless telephone service only for the exit area;

the base station responsive to a registration request from the wireless terminal for processing the registration request and for originating a telephone call to the wireless telephone by the base station via the wireless telecommunication switching system where the one of the plurality of base stations is the calling party of the telephone call;

the base station further comprises means for connecting the telephone call from the one of the plurality of base stations communicated via the wireless telecommunication switching system to the one of the wireless telephones where the one of the plurality of base stations remains the calling party and the one of the wireless telephone is the called party;

the base station further comprises means for generating an alerting message by the one of the plurality of base stations where the one of the plurality of base stations is the originating source of the alerting message and the alerting message states that a user is about to leave the facility with the one of wireless telephones; and the base station further transmitting the alerting message to the wireless terminal via the telephone call informing the user of the wireless telephone that the wireless telephone is about to leave the facility.

9. The apparatus of claim 8 wherein the alerting message results in an audio signal at the one of the wireless telephones.

10. The apparatus of claim 8 wherein the alerting message results in an alphanumeric display message on the one of the wireless telephones.

11. The apparatus of claim 8 wherein the alerting message results in an voice message to the one of the wireless telephones.

12. The apparatus of claim 8 further comprises an directional antenna attached to the base station for restricting the area of the wireless service that is provided by base stations.

\* \* \* \* \*